United States Patent

Kanda et al.

[15] 3,654,618

[45] Apr. 4, 1972

[54] MAGNETIC TAPE UNIT CONTROL SYSTEM

[72] Inventors: Kaoru Kanda, Yokohama; Tadahiro Kobayashi, Kawasaki, both of Japan

[73] Assignee: Fujitsu Limited, Kawasaki, Japan

[22] Filed: Oct. 23, 1970

[21] Appl. No.: 83,518

[30] Foreign Application Priority Data

Oct. 28, 1969 Japan....................................44/86273
Nov. 26, 1969 Japan....................................44/94885

[52] U.S. Cl. ................340/172.5, 340/174.1 H, 179/100.2 S
[51] Int. Cl. .......................................G06f 3/06, G06k 19/08
[58] Field of Search..................340/172.5, 174.1; 179/100.2

[56] References Cited

UNITED STATES PATENTS

| | | | |
|---|---|---|---|
| 2,971,716 | 2/1961 | Sampson | 179/100.2 X |
| 3,293,613 | 12/1966 | Gabor | 340/172.5 |
| 3,293,629 | 12/1966 | Oliver | 340/174.1 H |
| 3,355,711 | 11/1967 | Brooks et al. | 340/172.5 |
| 3,366,928 | 1/1968 | Rice et al. | 340/172.5 |
| 3,377,583 | 4/1968 | Sims, Jr. | 340/174.1 G |
| 3,423,744 | 1/1969 | Gerlach et al. | 340/174.1 G |
| 3,533,071 | 10/1970 | Epstein | 340/172.5 |
| 3,553,649 | 1/1971 | Madge et al. | 340/172.5 |
| 3,573,392 | 4/1971 | Trammell | 179/100.2 S |
| 3,586,769 | 6/1971 | Luther, Jr. | 178/6.6 A |

*Primary Examiner*—Paul J. Henon
*Assistant Examiner*—Jan E. Rhoads
*Attorney*—Curt M. Avery, Arthur E. Wilfond, Herbert L. Lerner and Daniel J. Tick

[57] ABSTRACT

Instruction decoding means decodes a received instruction. The instruction decoding means comprises a plurality of circuits each representing a different instruction and each providing an output signal at its output and decoding control means connected to each of the circuits for directing the decoded instruction in accordance with its contents to the input of a selected one of said circuits. Each of a plurality of storage circuits is coupled to the output of a corresponding one of the circuits of the instruction decoding means for storing the output signals of said circuits. A read and write circuit connected to the outputs of some of the storage circuits designates a selected one of a readout and a writein instruction and stores the designation in accordance with the contents of the storage circuits to which the read and write circuit is connected. A packing density circuit connected to the outputs of the others of the storage circuits designates a selected one of a first packing density and a second packing density and stores the designation in accordance with the contents of the storage circuits to which the packing density circuit is connected. The output of the read and write circuit is coupled to an input of the packing density circuit for designating the second packing density in the packing density circuit when the read and write circuit designates a readout. A packing density identification burst detecting means has an input coupled to a readout head of a magnetic tape for detecting the existence on the magnetic tape of a packing density identification burst. The output of the packing density identification burst detecting means is coupled to an input of the packing density circuit for designating the first packing density in said packing density circuit when the packing density identification burst detecting means fails to detect a packing density identification burst in the magnetic tape.

6 Claims, 9 Drawing Figures

Patented April 4, 1972 3,654,618

8 Sheets-Sheet 7

MAGNETIC TAPE UNIT CONTROL SYSTEM

DESCRIPTION OF THE INVENTION

The invention relates to a magnetic tape unit control system. More particularly, the invention relates to a readout or read and writein or write circuit system for a magnetic tape unit utilized as an auxiliary memory or storage in a data processing system.

The magnetic tape unit is utilized as a data storage medium wherein readout and writein are possible even when the density of the data stored on the magnetic tape is variable in accordance with the program or characteristics of the magnetic tape itself. This means that the means for determining the packing density of the magnetic tape unit must be stably operated although it must be variable for the readout of data on the magnetic tape in accordance with its packing density and for the writein of data on the magnetic tape in accordance with the designated packing density by means of programming, for example.

From the point of view of cost, floor space and facility of operation of a data processing system, two types of magnetic tape, each of different packing density, are generally utilized simultaneously in a single data processing system. A magnetic tape unit which is available for these two types of magnetic tapes is utilized in a single data processing system, as hereinbefore mentioned. The two types of packing density for data in a high speed, high density magnetic tape unit are 800 bits per inch and 1,600 bits per inch, each for a single track. The magnetic tape unit available for both these packing density magnetic tapes is hereinafter described.

A magnetic tape generally has a load point mark which indicates the beginning or commencement of data on the tape and an end of tape mark which indicates the end or termination of data on the tape. These marks enable the magnetic tape unit to detect the beginning and end of the available portions of the magnetic tape. Aside from these marks, when the packing density of data recorded or stored in the available portion of the magnetic tape is 1,600 bits per inch, a block of data known as the identification burst is recorded near the load point mark on the magnetic tape. The identification burst comprises a sequence of 1 signals and functions as a mark for identifying the packing density of the data on the magnetic tape at 1,600 bits per inch or 800 bits per inch.

Thus, when data recorded on the magnetic tape is read out, the identification burst is detected simultaneously with the detection of the load point mark. If the identification burst is detected, a control is instituted to read out the data after the load point mark recorded in the packing density of 1,600 bits per inch. If the identification burst is not detected, the control is instituted to read out the data after the load point mark recorded in the packing density of 800 bits per inch. Thus, when the data recorded on a magnetic tape is read out, the load point mark is detected first. At such time, the packing density is indicated by the detection or non-detection of the identification burst and the readout system is controlled to execute the readout in accordance with the designation of the packing density.

Ordinarily, the designation or determination of the packing density in a magnetic tape unit is accomplished by programming. Thus, in a conventional magnetic tape unit there are times when the packing density designated by the program and the actual packing density of the data recorded on the tape are different. For this reason, difficulties such as, for example, improper operation caused by the means for determining the packing density, sometimes occur. That is, notwithstanding the designation of 800 bits per inch packing density, if data on a magnetic tape is recorded at a density of 1,600 bits per inch, the identification burst cannot be detected with a small output, since the identification burst near the load point mark is read out by the readout circuit for 800 bits per inch.

Since the data at 800 bits per inch packing density is recorded by the "non return to zero change on one" system, hereinafter referred to as the NRZI system, shown in FIG. 1, and the data of 1,600 bits per inch packing density is recorded by the "phase encoding" system, hereinafter referred to as the PE system, the types of signals are different for both packing densities, and the outputs are extremely different. The amplitude must thus be varied for each packing density.

If the data recorded at a packing density of 1,600 bits per inch is read out via the readout circuit for a packing density of 800 bits per inch it is extremely difficult to identify the identification burst on the magnetic tape unit. This is due to the fact that the amplitude for signals recorded at a packing density of 800 bits per inch is less than the amplitude for signals recorded at a packing density of 1,600 bits per inch. Thus, even if the identification burst indicating a packing density of 1,600 bits per inch is read out, it is not amplified as much as the data recorded at a packing density of 1,600 bits per inch.

As shown in FIG. 3, the output ratio for reading out the data recorded at packing densities of 800 bits per inch and 1,600 bits per inch without changing the amplitude is approximately 2:1, when the readout circuit for a packing density of 800 bits per inch is utilized. Thus, even if the identification burst appears and is read out, a signal of only half the normal output may be obtained and results in reading error.

There is a dropout phenomenon in the magnetic tape unit which makes it impossible for the magnetic readout head to read out a signal due to scratches and dust on the surface of the magnetic tape and sometimes on the packing density indication. This results in the improper detection of, or failure to properly interpret, the identification burst, and the data recorded on the tape between the load point mark and the end of tape mark cannot be accurately read out. The circuit utilized in the magnetic tape unit of the prior art to detect the beginning and end of a data block and the occurrence of dropout within the data block is utilized to read out the packing density mark, identification burst, or packing density identification burst. When the circuit reads out data of two to three bits near the load point mark, such readout is immediately interpreted to indicate the existence of an identification burst and causes the operation of the means for determining the packing density. Thus, the existence of the identification burst is determined by the detection of only two to three bits of data.

When there is a point which is impossible to read out due to, for example, scratches on the surface of the magnetic tape within a sequence of data for the packing density identification burst, and if the identification burst is unexpectedly detected at such point, the identification burst cannot be read out. Dust is sometimes interpreted to be data and if a non-existent identification burst is detected this causes error in the means for determining the packing density and prevents accurate readout of the data block.

The principal object of the invention is to provide a new and improved magnetic tape unit control system.

An object of the invention is to provide a magnetic tape unit control system which overcomes the disadvantages of similar systems known in the art.

An object of the invention is to provide a magnetic tape unit control system which stably reads out the identification burst.

An object of the invention is to provide a magnetic tape unit control system which determines the packing density without error and determine whether or not the magnetic tape unit operates correctly at the packing density when the packing density is designated by programming, for example.

An object of the invention is to provide a magnetic tape unit control system which functions with efficiency, effectiveness and reliability.

In accordance with the invention, the packing density is preliminarily determined as being either 800 bits per inch or 1,600 bits per inch, in accordance with an instruction by the program to designate the packing density. When the next instruction is for writein, the writein is accomplished at the packing density instructed by the program. When the instruction is for readout, the packing density is determined to be 1,600 bits per inch by such instruction and a magnetic tape driving signal. The packing density is provided by means for further changing the packing density in accordance with the read out identification burst signal during the driving of the magnetic tape. Additional means identifies the identification burst signal or dust by amplifying the signal read out by the readout head. The amplified signal is then shaped as a pulse by a limit circuit, is integrated in an integrator having a large time constant, and is again shaped in another limit circuit.

In accordance with the invention, magnetic tape unit control system comprises input means for providing an instruction. Instruction decoding means connected to the input means decodes the instruction. The instruction decoding means comprises a plurality of circuits each representing a different instruction and each having an input and one output and providing an output signal at its output and decoding control means connected to each of the circuits for directing the decoded instruction in accordance with its contents to the input of a selected one of the circuits. Each of a plurality of storage circuits has an output and an input coupled to the output of a corresponding one of the circuits of the instruction decoding means for storing the output signals of the circuits. A read and write circuit has inputs connected to the outputs of some of the storage circuits for designating a selected one of a readout and a writein instruction and for storing the designation in accordance with the contents of the storage circuits to which the read and write circuit is connected. A packing density circuit has inputs connected to the outputs of the others of the storage circuits for designating a selected one of a first packing density and a second packing density and for storing the designation in accordance with the contents of the storage circuits to which the packing density circuit is connected. Coupling means connect an output of the read and write circuit to an input of the packing density circuit and designates the second packing density in the packing density circuit when the read and write circuit designates a readout. A readout head reads out data stored on a magnetic tape. Packing density identification burst detecting means having an output and an input coupled to the readout head detects the existence on the magnetic tape of apacking density identification burst. Additional coupling means connects the output of the packing density identification burst detecting means to an input of the packing density circuit and designates the first packing density in the packing density circuit when the packing density identification burst detecting means fails to detect a packing density identification burst in the magnetic tape.

Each of the plurality of circuits of the instruction decoding means comprises a flip flop circuit and each of the plurality of storage circuits comprises a flip flop circuit. Each of the read and write circuit and the packing density circuit comprises a flip flop circuit.

The read and write flip flop circuit has a reset output and the packing density flip flop circuit has a reset input. The coupling means comprises an AND gate having an output and input connected to the reset output of the read and write flip flop circuit and an OR gate having an input connected to the output of the AND gate and an output connected to the reset input of the packing density flip flop circuit.

The packing density flip flop circuit has a set input and one of the plurality of storage flip flop circuits has a set input and a set output connected to the set input of the packing density flip flop circuit. The additional coupling means comprises a NOT circuit having an output and an input connected to the output of the identification burst detection circuit, an OR gate having an input connected to the output of the NOT circuit and an output connected to the set input of the one of the storage flip flop circuits.

The packing density identification burst detecting means comprises amplifying means for amplifying the data read out by the readout head and producing an amplified data output signal. First limit circuit means limits the output signal of the amplifying means at a predetermined constant voltage limit level and produces a square pulse sequence output. First integrating circuit means integrates each pulse of the pulse sequence output of the first limit circuit means and produces an integrated output signal. Second limit circuit means limits the integrated output signal of the first integrated circuit means at a predetermined constant voltage limit level and produces an output signal. Second integrating circuit means integrates the output signal of the second limit circuit means at a larger time constant than that of the first integrating circuit means and produces an output signal. Third limit circuit means limits the output signal of the second integrating circuit means at a predetermined constant voltage limit level and produces an output signal. First output means provides the output signal of the third limit circuit means. Third integrating circuit means integrates the output signal of the third limit circuit means at a larger time constant than that of the second integrating circuit means and produces an output signal. Fourth limit circuit means limits the output signal of the third integrating circuit means at a predetermined constant voltage limit level and produces an output signal. Second output means provides the output signal of the fourth limit circuit means.

In order that the invention may be readily carried into effect, it will now be described with reference to the accompanying drawings, wherein.

Figure 4A:
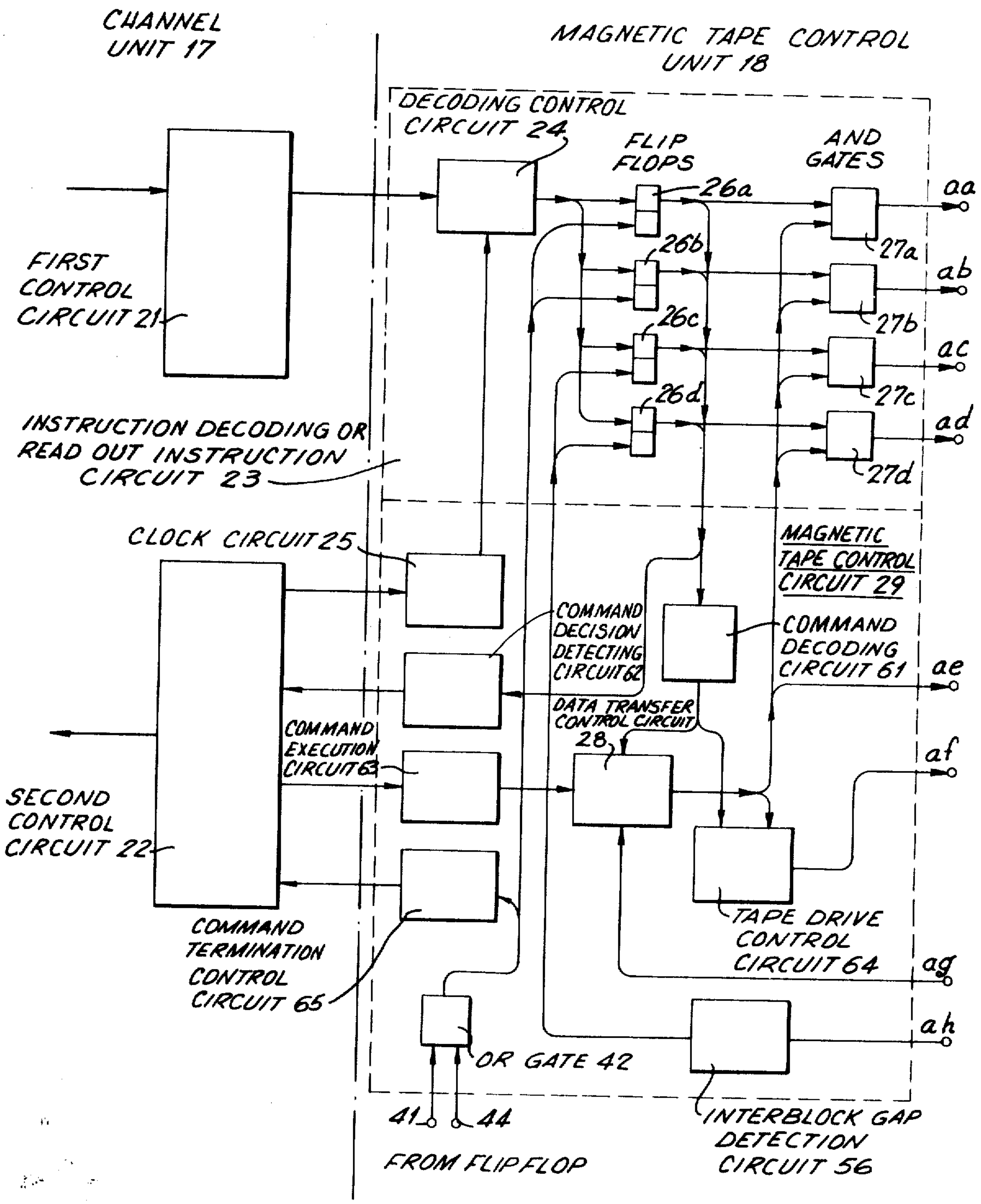
Figure 4B:
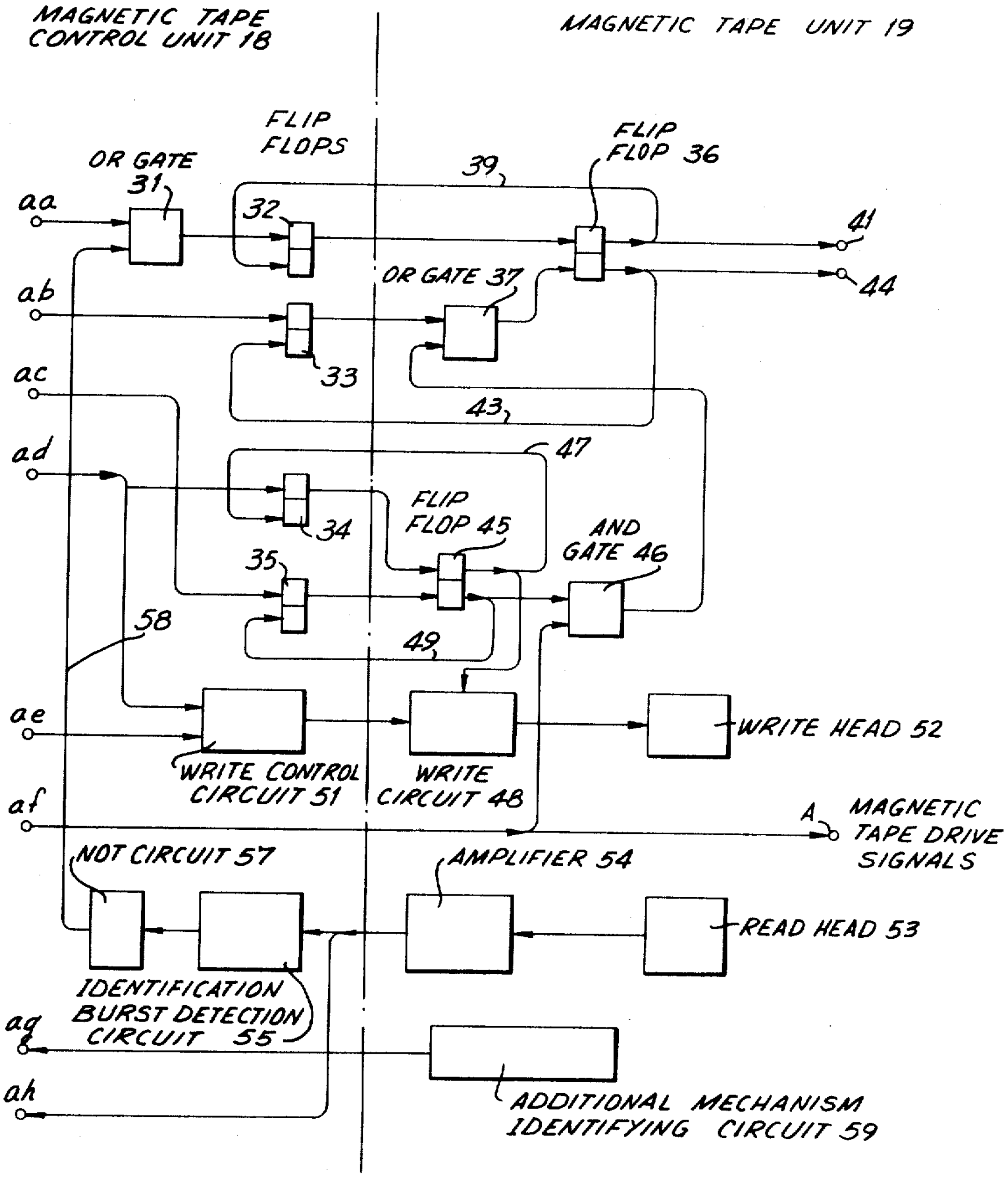
Figure 5:
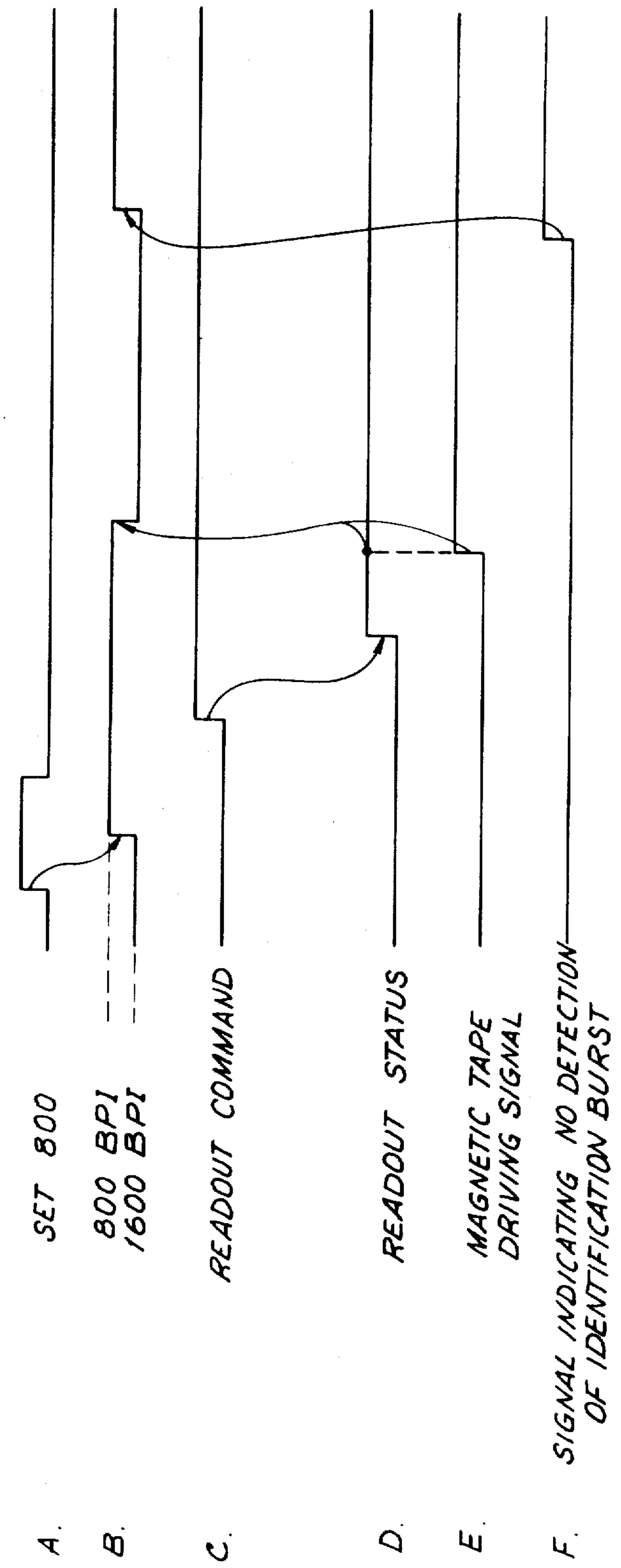

FIGS. 4*a* and 4*b*, which together constitute a single FIG., is a block diagram of an embodiment of the magnetic tape unit control system of the invention;

FIG. 5 is a graphical presentation of various signals appearing in the magnetic tape unit control system of FIG. 4*a*, 4*b*.

Figure 6A:
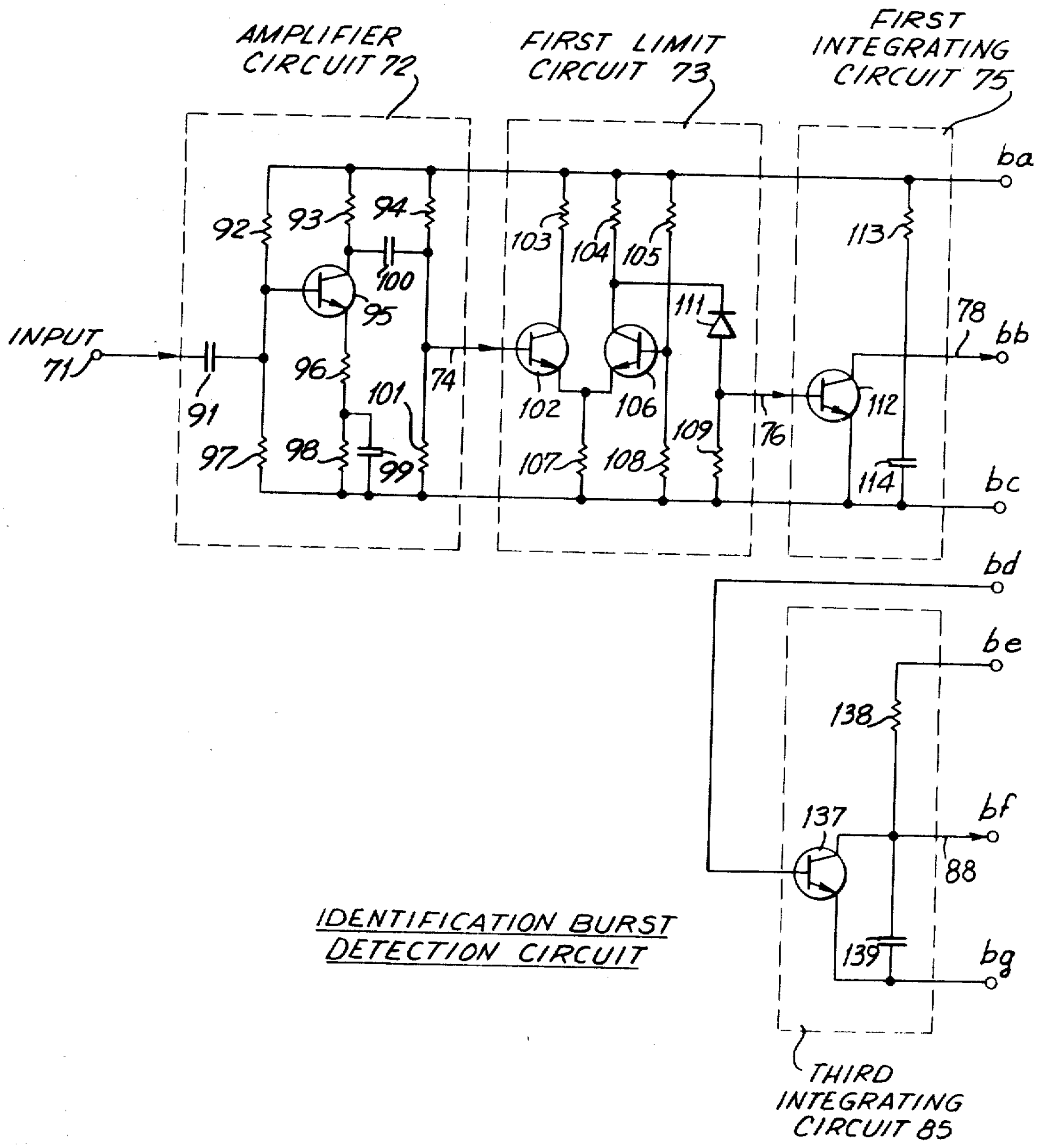
Figure 6B:
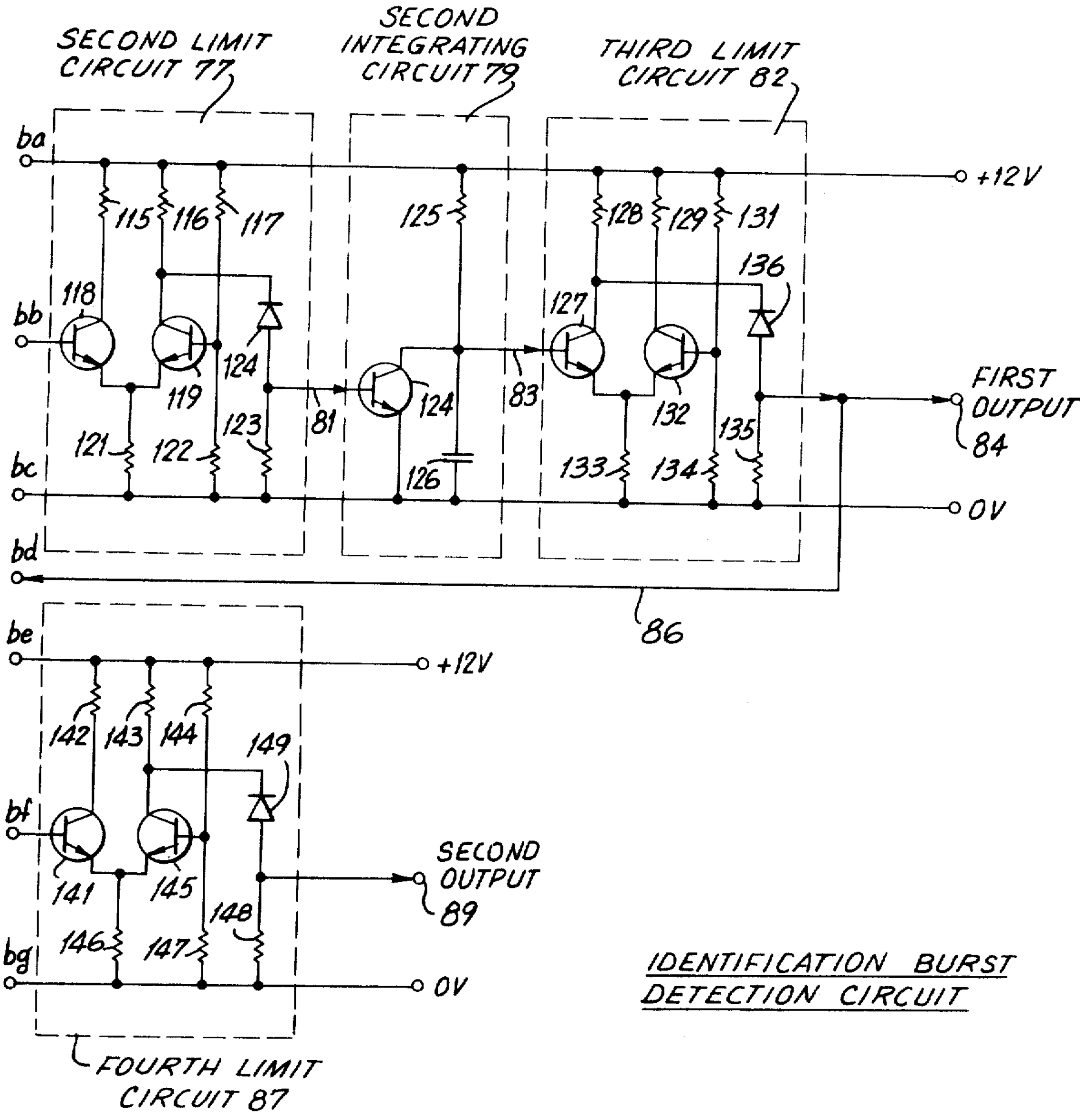
Figure 7:
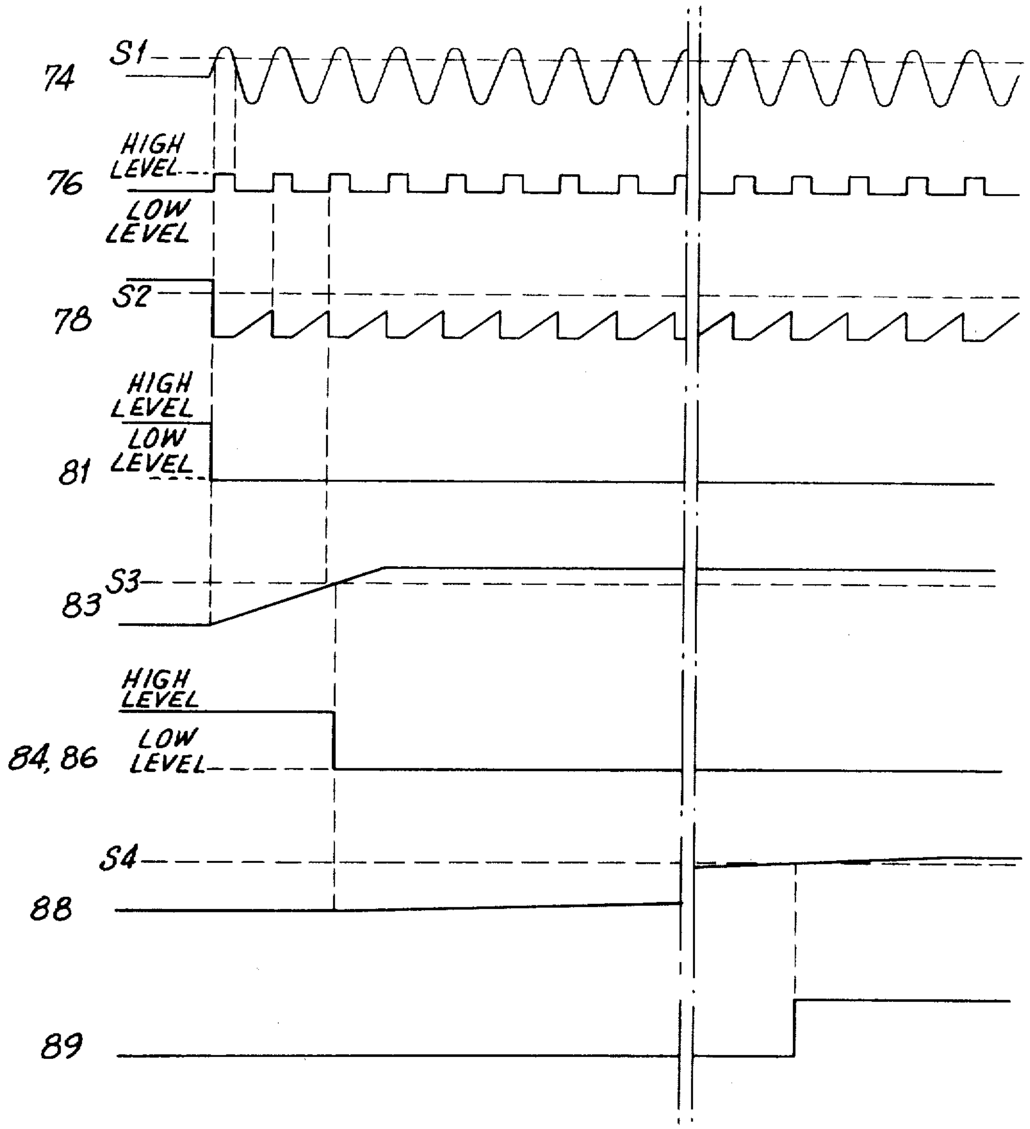

FIGS. 6*a* and 6*b*, which together constitute a single FIG., is a circuit diagram of an embodiment of the identification burst detection circuit of FIG. 4*a*, 4*b*; and FIG. 7 is a graphical presentation of various waveforms appearing in the circuit arrangement of FIG. 6*a*, 6*b*.

In the FIGS., the same components are identified by the same reference numerals.

Figure 1:
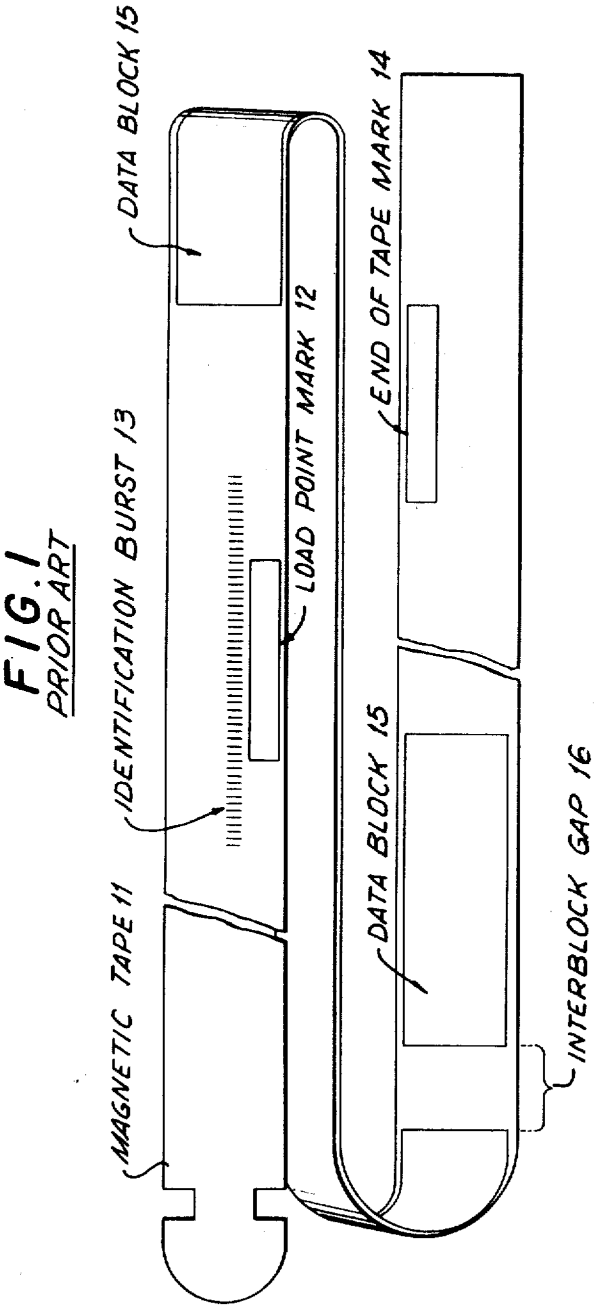
FIG. 1 PRIOR ART
FIG. 1 is a schematic diagram of a magnetic tape of the prior art.

In FIG. 1, a magnetic tape 11 has a load point mark 12 on its surface and an identification burst packing density work or packing density identification burst 13 thereon, as hereinbefore described. The magnetic tape 11 also has an end of tape mark 14 on its surface, as hereinbefore described. A data block 15, in which data is recorded on the magnetic tape 11, extends between the load point mark 12 and the end of tape mark 14. An interblock gap 16 may be provided between segments of the data block 15.

Figure 2:
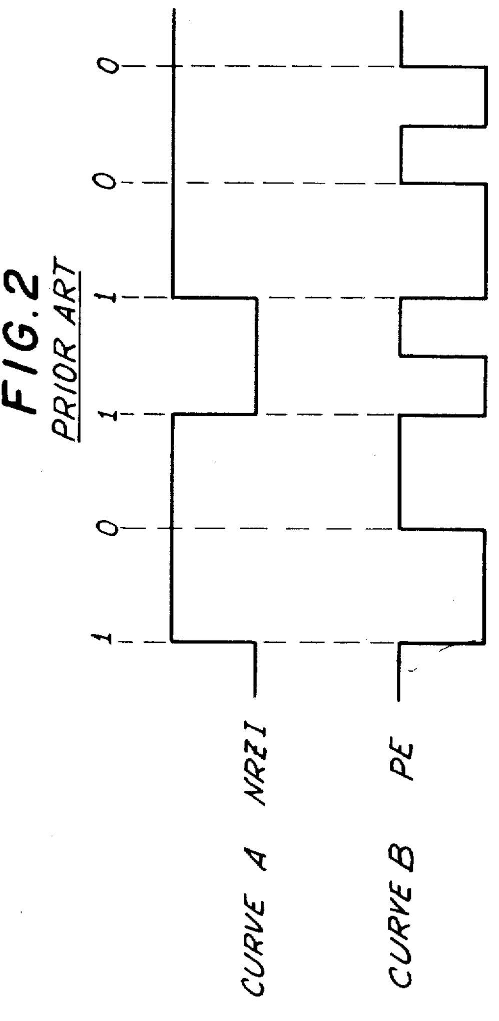
FIG. 2 PRIOR ART
FIG. 2 is a graphical presentation of known waveforms utilized to record data in a magnetic tape.

Curve A of FIG. 2 illustrates the NRZI system of FIG. 1 and curve B of FIG. 2 illustrates the PE system. As hereinbefore described, the NRZI system is the "non return to zero change on one" system and the PE system is the "phase encoding" system.

Figure 3:
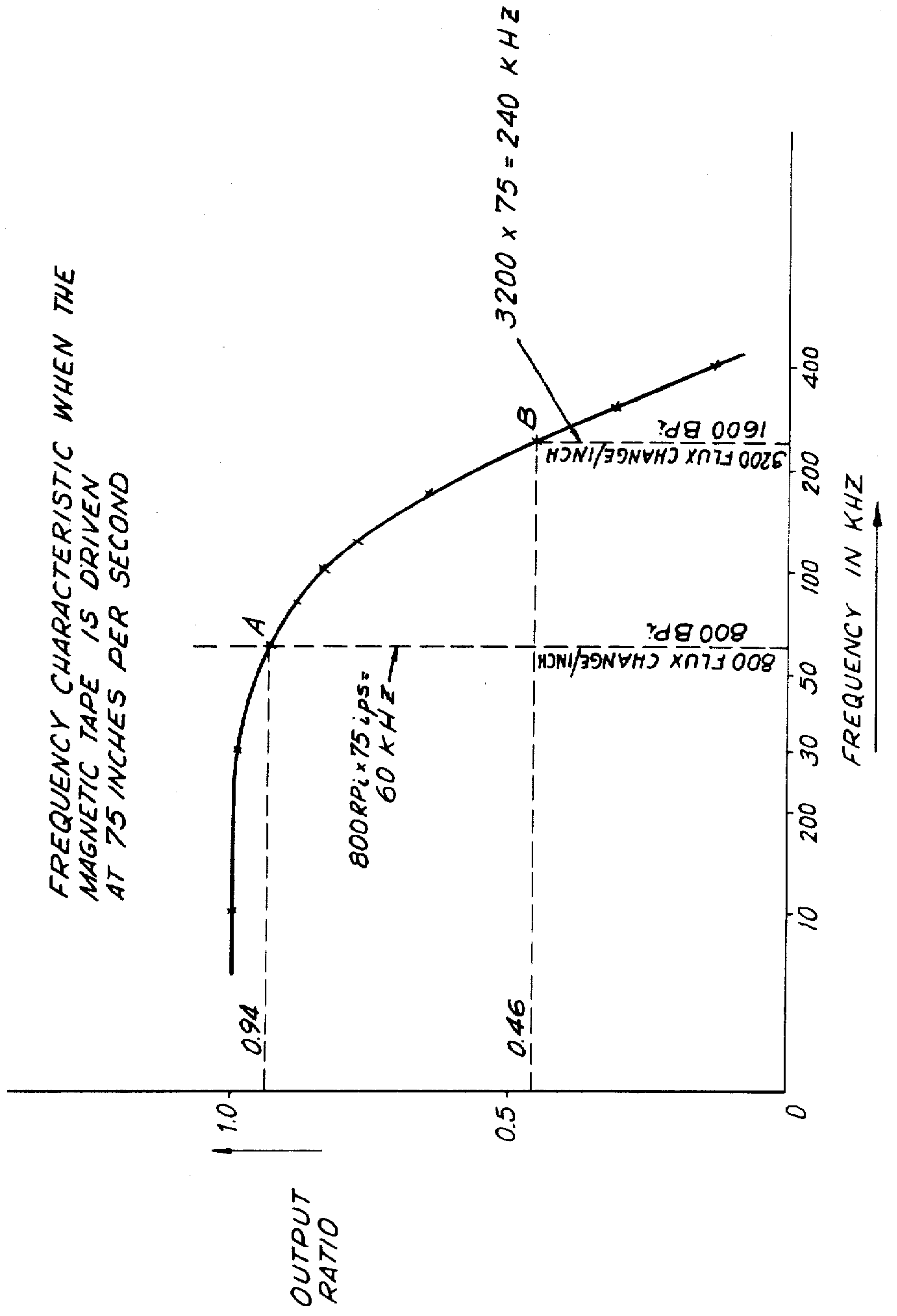
FIG. 3 PRIOR ART
FIG. 3 is a graphical presentation illustrating the disadvantages of conventional magnetic tape unit control systems.

FIG. 3 illustrates the frequency characteristic when the magnetic tape is driven at 75 inches per second. In FIG. 3, the abscissa represents the frequency in kilohertz and the ordinate represents the output ratio.

FIG. 4*a*, 4*b* shows the magnetic tape unit control system of the invention. The magnetic tape unit control system of FIG. 4*a*, 4*b* comprises a channel unit 17, a magnetic tape control unit 18 and a magnetic tape unit 19. A first control circuit 21 and a second control circuit 22 are included in each single channel unit 17. The magnetic tape control unit 18 comprises an instruction decoding or readout instruction circuit 23. The instruction decoding circuit 23 comprises a decoding control circuit 24 having an input connected to the output of the first control circuit 21. The decoding control circuit 24 decodes the command from the first control circuit 21 of the channel unit 17 and sets two of four flip flops in accordance with clock or time signals or pulses supplied to said decoding control circuit from a clock circuit 25.

The four flip flops controlled by the decoding control circuit 24 are flip flops 26*a*, 26*b*, 26*c* and 26*d*. The output of the decoding control circuit 24 is connected in common to the set input of each of the flip flips 26*a* to 26*d*. The output of each of the flip flops 26*a* to 26*d* is connected to a first input of each of a plurality of AND gates 27*a*, 27*b*, 27*c* and 27*d*.

The flip flop 26*a* stores or memorizes the command from the decoding control circuit 24 when it is to set 800 bits per inch. The flip flop 26*b* memorizes or stores the command from the decoding control circuit 24 when it is to set 1,600 bits per inch The flip flop 26*c* memorizes or stores the command from the decoding control circuit 24 when it is a readout command. The flip flop 26*d* memorizes or stores the command from the decoding control circuit 24 when it is a writein command.

A data transfer control circuit 28 is included, with the clock circuit 25, in a magnetic tape control circuit 29 of the magnetic tape control unit 18. The output of the data transfer control circuit 28 is connected in common to the second input of each of the AND gates 27*a* to 27*d* of the instruction decoding circuit 23. Thus, when signals are supplied to both inputs of any of the AND gates 27*a* to 27*d*, such AND gate is switched to its conductive condition.

The magnetic tape control unit 18 includes an OR gate 31 having a first input connected to the output of the AND gate 27*a* of the instruction decoding circuit 23. The output of the OR gate 31 is connected to the set input of a flip flop 32. The magnetic tape control unit 18 also includes a flip flop 33. The output of the AND gate 27*b* of the instruction decoding circuit 23 is connected to the set input of the flip flop 33. A flip flop 34 is included in the magnetic tape control unit 18. The output of the AND gate 27*d* is connected to the set input of the flip flop 34. A flip flop 35 is also included in the magnetic tape control unit 18. The output of the AND gate 27*c* of the instruction decoding circuit 23 is connected to the set input of the flip flop 35.

The flip flop 32 is set when the packing density is 800 bits per inch. The flip flop 33 is set when the packing density is 1,600 bits per inch. The flip flop 34 is operated by a writein command. The flip flop 35 is operated by a readout command.

The magnetic tape unit 19 comprises a flip flop 36 which designates the packing density and transmits said packing density to the magnetic tape control circuit 29. The set output of the flip flop 32 of the magnetic tape control unit 18 is connected to the set input of the flip flop 36. The set output of the flip flop 33 of the magnetic tape control unit 18 is connected to a first input of an OR gate 37 of the magnetic tape unit 19. The output of the OR gate 37 is connected to the reset input of the flip flop 36. The set output of the flip flop 36 is fed back to the reset input of the flip flop 32 via a feedback loop 39 and is also connected to an output terminal 41 which functions as the input terminal for a first input of an OR gate 42 of the magnetic tape control circuit 29. The reset output of the flip flop 36 is connected to the reset input of the flip flop 33 of the magnetic tape control unit 18 via a lead 43 and is also connected to an output terminal 44 which is connected to the second input of the OR gate 42.

The magnetic tape control unit 19 includes a flip flop 45 and an AND gate 46. The set output of the flip flop 34 of the magnetic tape control unit 18 is connected to the set input of the flip flop 45. The set output of the flip flop 35 of the magnetic tape control unit 18 is connected to the reset input of the flip flop 45. The set output of the flip flop 45 is connected to the reset input of the flip flop 34 via a lead 47 and is also connected to an input of a write circuit 48 of the magnetic tape unit 19. The reset output of the flip flop 45 is connected to a first input of the AND gate 46 and is also connected to the reset input of the flip flop 35 via a lead 45. The output of the AND gate 46 is connected to the second input of the OR gate 37.

The magnetic tape control unit 18 includes a write control circuit 51 having an input connected to the output of the AND gate 27*d* of the instruction decoding circuit 23 and another input connected to the output of the data transfer control circuit 28 of the magnetic tape control circuit 29. The output of the write control circuit 51 is connected to an input of the write circuit 48 of the magnetic tape unit 19. The output of the write circuit 48 is connected to the input of a write head 52 of the magnetic tape unit 19. The magnetic tape unit 19 includes a read head 53 and an amplifier 54. The output of the read head 53 is connected to the input of the amplifier 54. The output of the amplifier 54 is connected to the input of an identification burst detection circuit 55 of the magnetic tape control unit 18 and is also connected to the input of an interblock gap detection circuit 56 of the magnetic tape control circuit 29. The output of the identification burst detection circuit 55 is connected to the second input of the OR gate 31 via a NOT circuit 57 and a lead 58. The magnetic tape unit 19 also includes an additional mechanism identifying circuit 19.

The output of the additional mechanism identifying circuit 59 is connected to an input of the data transfer control circuit 28 of the magnetic tape control circuit 29. The magnetic tape control circuit 29 includes a command decoding circuit 61 having an input connected in common to the set output of each of the flip flops 26*a* to 26*d* of the instruction decoding circuit 23. The set outputs of the flip flops 26*a* to 26*d* of the instruction decoding circuit are also connected in common to the input of a command decision detecting circuit 62 of the magnetic tape control circuit 29. The output of the command decision detecting circuit 62 is connected to an input of the second control circuit 22. The input of the clock circuit 25 is connected to an output of the second control circuit 22.

The magnetic tape control circuit 29 also includes a command execution circuit 63 having an input connected to an output of the second control circuit 22 and an output connected to an input of the data transfer control circuit 28. The output of the data transfer control circuit 28 is connected to an input of a tape drive control circuit 64. The output of the command decoding circuit 61 is connected to another input of the tape drive control circuit 64. The output of the tape drive control circuit 64 is connected to an output terminal A and to the second input of the AND gate 46 of the magnetic tape unit 19.

The output of the interblock gap detection circuit 56 is connected in common to the reset input of each of the flip flops 26*c* and 26*d*. The output of the OR gate 42 is connected in common to the reset input of each of the flip flops 26a and 26b of the instruction decoding circuit 23 and to the input of a command termination control circuit 65 of the magnetic tape control circuit 29. The output of the command termination control circuit 65 is connected to an input of the second control circuit 22.

The clock circuit 25 of the magnetic tape control circuit 29 times the setting of the command to the flip flops 26*a* to 26*d* of the instruction decoding circuit 23, when the second control circuit 22 commands said clock circuit to set the timing and controls said clock circuit. The command decision detecting circuit 62 determines the conditions under which the command is set in the flip flops 26*a* to 26*d* and advises the second control circuit 22 to execute such command. The command execution circuit 63 determines the instruction of command execution provided by the second control circuit 22 and advises the data transfer control circuit 28 in accordance with such determination. The command termination control circuit 65 transfers the command termination signal to the second control circuit 22 of the channel unit 17.

The command decoding circuit 61 decodes the command set in the flip flops 26*a* to 26*d* and determines whether or not the magnetic tape is to be driven. The command decoding circuit 61 advises each of the data transfer control circuits 28 and the tape drive control circuit 64 whether or not the magnetic tape is to be driven. The data is transferred to the AND gates 27*a* to 27*d* from the data transfer control circuit 28. The data transfer control circuit 28 also transfers the data to the tape drive control circuit 64 and to the write control circuit 51 after considering the data from the magnetic tape unit 19, the contents supplied by the command decoding circuit 61 and the execution command supplied by the command execution circuit 63. The tape drive control circuit 64 commands the driving of the magnetic tape in the magnetic tape unit 19 in accordance with the data supplied by the command decoding circuit 61 and the data transfer control circuit 28. The interblock gap detection circuit 56 detects the interblock gap between data blocks.

Magnetic tape driving signals are provided at the output terminal A of the magnetic tape unit 19. The channel unit 17 functions to connect the input and output control units and the central processor unit (not shown in the FIGS.). The magnetic tape control unit 18 functions to select and control the magnetic tape unit. The magnetic tape unit 19 provides storage on the magnetic tape.

The first control circuit 21 provides instructions for designating the packing density by the program and transfers such instructions to the magnetic tape control unit 18. If this is undertaken at the time that the load point mark is detected in the magnetic tape unit, the instruction is decoded in the instruction decoding circuit 23, and the flip flop 26*a* for a packing density of 800 bits per inch, or the flip flop 26*b* for a packing density of 1,600 bits per inch is set.

It is possible to alter the packing density in the magnetic tape unit only when the load point mark is detected. There is absolutely no alteration of the packing density, in any case, if the load point mark is not detected. This is because if the alteration of the packing density is permitted at points other than the load point marker, data is provided on the magnetic tape in different packing densities, so that error results. Furthermore, the load point mark is presently detected by the use of a photoelectric effect and aluminum foil, which reflects light, is affixed to the magnetic tape to indicate the load point mark. The aluminum foil indicating the load point mark is illuminated and the reflected light is detected by a photocell.

The transfer of instructions for designating the packing density after the detection of the load point mark is as follows: The command designating the packing density is transferred from the first control circuit 21 to the decoding control circuit 24 of the instruction decoding circuit 23. The decoding control circuit 24 decodes the packing density command and sets one of the flip flops 26*a* and 26*b* in accordance with the designation of the packing density, under the control of the clock signals from the clock circuit 25. Thus, for a packing density of 800 bits per inch, the flip flop 26*a* is set and for a packing density of 1,600 bits per inch, the flip flop 26*b* is set. The flip flop 26*a* or 26*b*, which is set, produces an output signal which is transferred by the AND gate 27*a* or 27*b*, respectively, under the control of the data transfer control circuit 28. When the flip flop 26*a* is set, it output signal sets the flip flop 32 under the control of the data transfer control circuit 28. When the flip flop 26*b* is set, its output signal sets the flip flop 33 under the control of the data transfer control circuit 28.

The set flip flop 32 or 33 transfers an output signal to the magnetic tape unit 19. If the flip flop 32 is set, its output signal sets the flip flop 36. If the flip flop 33 is set, its output signal resets the flip flop 36. Thus, the set condition of the flip flop 36 indicates a packing density designation of 800 bits per inch and the reset condition of said flip flop indicates a packing density designation of 1,600 bits per inch. The packing density designation instruction is then recorded with the program. Simultaneously, the flip flop 32 or the flip flop 33 is reset by the flip flop 36 after setting or resetting, respectively, said flip flop 36. The set output of the flip flop 36 is transmitted to the OR gate 32 via the terminal 41 and the reset output from said flip flop is transmitted to said OR gate via the terminal 44.

The additional mechanism identifying circuit 59 of the magnetic tape unit 19 is predetermined and provided for a magnetic tape unit which may be operated only at a packing density of either 800 bits per inch or 1,600 bits per inch. The control signal is transferred from the additional mechanism identifying circuit 59 to the data transfer control ciecuit 28. The data transfer control circuit 28 determines whether or not the packing density designation instruction of the program may be executed, and the result of the determination is sent to the central processor unit (not shown in the FIGS.).

When the writein instruction is provided via the first control circuit 21 of the channel unit 17 after the flip flop 36 for the packing density designation is set, the decoding control circuit 24 of the instruction decoding circuit 23 decodes said instruction. The decoded writein instruction provided by the decoding control circuit 24 sets the flip flop 26d under the control of the clock signal supplied by the clock circuit 25. The set output signal provided by the flip flop 26d is transferred by the AND gate 27*d* under the control of the data transfer control circuit 28. The signal transferred by the AND gate 27*d* sets the flip flop 34. The set output signal of the flip flop 34 sets the read and write, read, write or write, read flip flop 45. The data signals from the write control circuit 51 and the set output signals from the flip flop 45 are controlled in the write circuit 48 and are recorded on the magnetic tape by the write head 52.

When a readout instruction is transferred to the magnetic tape control unit 18 from the first control circuit 21 of the channel unit 17, said instruction is decoded by the decoding control circuit 24 of the instruction decoding circuit 23. The decoded readout instruction provided by the decoding control circuit 24 sets the flip flop 26*c*. The set output signal of the flip flop 26*c* is transferred by the AND gate 27*c* under the control of the data transfer control circuit 28. The signal transferred by the AND gate 27*c* sets the flip flop 35 and the set output signal of the flip flop 35 resets the read, write flip flop 45. When the magnetic tape driving signal is provided at the output terminal A by the tape drive control circuit 64, the magnetic tape unit is driven, the logical product is provided by the AND gate 46 with the reset output signal of the read, write flip flop 45, and a signal indicating the 1,600 bits per inch packing density is supplied to the flip flop 36 via the OR gate 37 to reset the flip flop 36. The flip flop 36 then provides a reset output signal at its output terminal 44 thereby designating the packing density as 1,600 bits per inch. Thus, even if the packing density is predetermined as 800 bits per inch by the program instruction, the packing density designation of the magnetic tape unit is necessarily set at 1,600 bits per inch by the provision of a readout instruction.

When the driving of the magnetic tape commences, the readout head 53 commences to read out the data recorded on the magnetic tape. Simultaneously with the commencement of the readout, the load point mark is detected by a load point mark detector. The identification burst detection circuit 55 determines whether or not the identification burst is near the load point mark. If the identification burst is detected, the flip flop 26*b* which sets 1,600 bits per inch as the packing density designation is in its reset or uncharged condition. Readout continues at the specified packing density of 1,600 bits per inch.

If the identification burst is not detected, the NOT circuit 57 of the magnetic tape control unit 18 operates immediately. The signal which determines a packing density of 800 bits per inch is transmitted and said signal sets the flip flop 36 via the OR gate 31 and the flip flop 32. The flip flop 36 then designates a packing density of 800 bits per inch. Thus, correct readout is provided, without packing density error, even if a data block is subsequently identified and the readout of data has commenced.

FIG. 5 illustrates the various signals in FIGS. 4*a*, 4*b* when the packing density designated by the program is 800 bits per inch. The designation by the first control circuit 21 of FIGS. 4*a*, 4*b* of a packing density of 800 bits per inch is illustrated by the waveform of curve A of FIG. 5. Curve B of FIG. 5 illustrates the set output of the flip flop 36 of FIGS. 4*a*, 4*b* designating a packing density of 800 bits per inch. Curve C of FIG. 5 illustrates the readout command. When the readout command is provided, the read, write flip flop 45 is set to its readout status, as illustrated in curve D of FIG. 5. The reset output signal of the flip flop 36, which designates a packing density of 1,600 bits per inch, is provided by resetting said flip flop by a control signal transferred from the tape drive control circuit 64, which control signal is the magnetic tape driving signal provided at the output terminal *4a*, *4b*, and shown in curve E of FIG. 5. The identification burst is then detected. If no identification burst is detected, the signal of curve F of FIG. 5 is provided and the flip flop 36 is set, thereby designating a packing density of 800 bits per inch.

FIGS. *6a*, *6b* is a circuit diagram of an embodiment of the identification burst detection circuit 55 of FIGS. *4a*, *4b*. FIG. 7 shows the various waveforms appearing in the identification burst detection circuit of FIGS. *6a*, *6b*. The identification burst detection circuit FIGS. *6a*, *6b* comprises an input terminal 71, a known amplifier circuit 72 having an input connected to the input terminal 71 and an output. A first limit circuit, peak limiter or slice circuit 73 of known type has an input connected to the output of the amplifier circuit 72 via a lead 74. The output of the first limit circuit 73 is connected to the input of a first integrating circuit 75 of known type via a lead 76. A second limit circuit, peak limiter or slice circuit 77 of known type has an input connected to the output of the first integrating circuit 75 via a lead 78. The output of the second limit circuit 77 is connected to the input of a second integrating circuit 79 of known type via a lead 81.

A third limit circuit, peak limiter or slice circuit 82 of known type has an input connected to the output of the second integrating circuit 79 via a lead 83. A first output terminal 84 is connected to the output of the third limit circuit 82. The output of the third limit circuit 82 is connected to the input of a third integrating circuit 85 of known type via a lead 86. The output of the third integrating circuit 85 is connected to the input of a fourth limit circuit, peak limiter or slice circuit 87 of known type via a lead 88. A second output 89 is connected to the output of the fourth limit circuit 87.

Since each of the circuits 72, 73, 75, 77, 79, 82, 85 and 87 is a known circuit, it is not described herein. The principal components of each of these circuits are shown in FIGS. *6a*, *6b*, however.

When the driving of the magnetic tape is commenced and the identification burst or packing density mark is read out by the readout head, the readout signal is supplied to the amplifier circuit 72 of FIGS. *6a*, *6b* via the input terminal 71. The amplifier circuit 72 amplifies the readout signal and supplies the amplified readout signal to the first limit circuit or peak limiter 73. The amplified readout signal is shown by curve 74 of FIG. 7. The first limit circuit 73 classifies the input signal as a low level signal when said input signal is equal to or less than a predetermined constant limit voltage S1 and produces a corresponding low level output signal. When the input signal is higher than the limit voltage S1, the first limit circuit 73 produces a high level output signal. The output signal produced by the first limit circuit 73 is shown by curve 76 of FIG. 7.

When the input signal shown in curve 76 of FIG. 7 is a high level signal, a capacitor 114 of the first integrating circuit 75 is discharged and produces an output signal of approximately 0 volts. When the input signal in the lead 76 is a low level signal, the capacitor 114 of the first integrating circuit 75 is charged and the output signal of said first integrating circuit is increased by the time constant C114R113. The time constant C114R113 is provided by the capacitor 114 and a resistor 113. Thus, when a high level pulse is provided in the waveform of the curve 76 of FIG. 7, integration is started in the first integrating circuit 75. Upon the supply of the next high level pulse, the circuit is discharged and the first integrating circuit 75 produces an output signal shown by the curve 78 of FIG. 7.

In the second limit circuit 77, the output signal is produced as a low level signal when the input signal in the lead 78 is equal to or less than a predetermined constant limit voltage S2. When the input signal in the lead 78 is greater than the limit voltage S2, a high level output signal is produced by the second limit circuit 77. The second limit circuit 77 thus produces an output signal, illustrated by the curve 81 of FIG. 7, in the lead 81. The integration time constant C114R113 of the first integrating circuit 75 is approximately two bytes. A byte is the period of time from the trailing edge of a specific high level pulse to the leading edge of the next-succeeding high level pulse, as shown in the curve 76 of FIG. 7. For a normal readout signal, the integrated signal never exceeds the limit voltage of the second limit circuit 77.

When the output signal in the lead 81 is a high level signal, a capacitor 126 of the second integrating circuit 79 is discharged and produces an output signal of approximately 0 volts. When the signal in the lead 81 is a low level signal, the capacitor 126 is charged and the output signal of the second integrating circuit 79 is increased by a time constant C126R125, and said second integrating circuit produces an output signal in the lead 83 shown by the curve 83 of FIG. 7. The time constant C126R125 is provided by the capacitor 126 and a resistor 125. When the signal in the lead 83 is equal to or less than a constant limit voltage S3, the third limit circuit 82 produces a high level output signal. When the input signal in the lead 83 is greater than the limit voltage S3, the third limit circuit 82 produces a low level output signal. The third limit circuit thus produces an output signal illustrated by the curve 84, 86 of FIG. 7.

The integration time constant C126R125 of the second integrating circuit 79 is a period of approximately four bytes. The output signal of the third limit circuit 82 becomes a low level signal after a delay of approximately four bytes after the provision of the readout signal, as shown by the curve 84, 86 of FIG. 7. The output signal of the third limit circuit 82 is provided at the first output terminal 84 and is ordinarily utilized to detect the beginning and end of the data block on the magnetic tape and the dropout, and has no direct relation to the detection of the identification burst.

The output signal at the output terminal 84 is supplied to an AND gate (not shown in the FIGS.) wherein the logical product is produced with the sampling pulse, and the output signal of the AND gate is transferred to the readout control unit, as the signal indicating the detection of the packing density identification burst. If there is no identification burst or packing density mark, the output signal is not provided at the first output terminal 84. The packing density of the magnetic tape unit may then be designated as 800 bits per inch, in accordance with whether or not there is an output signal provided by the AND gate (not shown in the FIGS.).

In the identification burst detection circuit of FIGS. *6a*, *6b*, however, when the output signal of the third limit circuit 82 is combined with the sampling pulse for the detection of the identification burst, even if the identification burst is on the magnetic tape, if there is no output signal from said third limit circuit due to, for example, dropout of the magnetic tape, that is, when the first readout data is supplied from the magnetic tape via the readout head, and the subsequent readout data cannot be read out from the magnetic tape due to scratches or dust on the surface of said tape, the two-byte period of the data in the first integrating circuit 75 varies, the integrated waveform exceeds the limit voltage S1, and the data is considered to be non-existent from the beginning.

Thus, when there is no output signal from the second integrating circuit 79 or from the third limit circuit 82, the signal which indicates the existence of the packing density identification burst on the magnetic tape cannot be transmitted. Conversely, when a sampling pulse is provided even if the packing density identification burst is not detected, there is a possibility that noise may be provided at the first output terminal 84, thereby causing the signal indicating the existence or detection of the packing density identification burst to be transmitted. In a known magnetic tape unit control system, an AND gate is not utilized, and when the output signal of the third limit circuit is a low level signal, it is determined that the packing density identification burst exists. Even in this case, however, there are many possibilities for considering that the packing density identification burst exists, when, in actuality, it does not exist.

In accordance with the invention, the circuit arrangement of FIG. 6*b* prevents the erroneous indication of the existence of the packing density identification burst. In accordance with the invention, the third integrating circuit 85 and the fourth limit circuit 87 are added to the conventional identification burst detection circuit in FIGS. 6*a*, 6*b*. The amplifier circuit 72, the first limit circuit 73, the first integrating circuit 75, the second limit circuit 77, the second integrating circuit 79 and the third limit circuit 82 constitute a known identification burst detection circuit and are therefore not further described.

The output signal of the third limit circuit 82 is supplied to the input of the third integrating circuit 85. A capacitor 139 of the third integrating circuit 85 is discharged if the input signal is a high level signal. The output signal of the third integrating circuit 85 is then zero. When the input signal of the third integrating circuit 85 is a low level signal, the capacitor 139 is charged and the output signal of said third integrating circuit is increased by a time constant C139R138, provided by said capacitor and a resistor 138. The output signal of the third integrating circuit 85 is provided in the lead 88, is illustrated by the curve 88 of FIG. 7, and is supplied to the fourth limit circuit 87.

When the input signal of the fourth limit circuit 87 is equal to or less than a constant limit voltage S4, said fourth limit circuit produces a low level output signal at the second output terminal 89. When the input signal of the fourth limit circuit 87 is greater than the constant limit voltage S4, the fourth limit circuit produces a high level output signal at the second output terminal 89. The output signal of the fourth limit circuit 87 is illustrated by curve 89 of FIG. 7.

The integration time constant C139R138 of the third integrating circuit 85 is approximately 200 bytes, and after a time delay of approximately 200 bytes from the start of the readout signal, the output signal of the fourth limit circuit 87 becomes a high level signal. A high level output signal of the fourth limit circuit 87 is considered to indicate the existence of an identification burst. Therefore, the continuous provision of readout signals for a duration of 200 bytes is considered to indicate the existence of an identification burst.

In a conventional identification burst detection circuit, the integrating circuit has a small time constant, and the readout of a small portion, of approximately three to five bytes, of the packing density identification burst is utilized to determine the existence or non-existence of said identification burst. In the identification burst detection circuit of the present invention, however, the integrating circuit has a large time constant, and the packing density identification burst is not identified unless more than approximately 200 bytes are read out. Usually, since more than 1,000 bytes of data are stored, 200 bytes may be read out with facility. Therefore, although noise is sometimes erroneously considered as indicating the existence of a packing density identification burst in the known circuit, this is not the case in the circuit of the invention, since in the circuit of the invention, there is no identification of the packing density identification burst unless more than approximately 200 byte are read out. Thus, if noise of approximately four or five bytes is present, there is no possibility of the circuit of the invention identifying such noise as the packing density identification burst.

Although a third integrating circuit and a fourth limit circuit are shown in FIGS. 6*a*, 6*b*, these may be replaced by digital counters. In such case, the packing density identification burst may be detected by an excess of a counted magnitude over a specific magnitude. Furthermore, in the circuit of the invention, the output signal of the third limit circuit 82 is the input of the third integrating circuit 85. However, the output of the second limit circuit 77 may be connected to the input of the third integrating circuit 85 with almost no difference in operation.

Although only two types of packing densities of 800 bits per inch and 1,600 bits per inch have been utilized in the foregoing examples of the invention, the invention is not so limited and is applicable to all packing densities.

Although in an example of the invention, the central processor unit, the channel unit, the magnetic tape control unit and the magnetic tape unit are shown as connected in such sequence, the invention is the same even when the central processor unit functions as the channel unit and is connected to the magnetic tape control unit, with the channel unit eliminated.

While the invention has been described by means of specific examples and in a specific embodiment, we do not wish to be limited thereto, for obvious modifications will occur to those skilled in the art without departing from the spirit and scope of the invention.

We claim:

1. A control system for a magnetic tape unit, comprising:

input means for providing an instruction;

instruction decoding means connected to said input means for decoding the instruction, said instruction decoding means comprising a plurality of circuits, each representing a different instruction and each having an input and one output and providing an output signal at its output, and decoding control means connected to each of said circuits for directing the decoded instruction in accordance with its contents to the input of the corresponding one of said circuits;

a read and write circuit, having inputs connected to the outputs of certain of the instruction decoding means, for designating the selection of a readout or a written in instruction, and for storing said designation in accordance with the contents of the instruction decoding means to which said read and write circuit is connected;

a packing density circuit, having inputs connected to the outputs of the remaining instruction decoding means, for designating the selection of a first packing density or a second packing density, and for storing said designation in accordance with the contents of the instruction decoding means to which said packing density circuit is connected;

coupling means, connecting an output of the read and write circuit to an input of the packing density circuit, for designating the second packing density in said packing density circuit when the read and write circuit designates a readout;

a readout head for reading out data stored on the magnetic tape unit;

packing density identification burst detecting means, having an output and an input coupled to said readout head, for detecting the existence on the magnetic tape of a packing density identification burst; and additional coupling means, connecting the output of the packing density identification burst detecting means to an input of the packing density circuit, for designating the first packing density in said packing density circuit when said packing density identification burst detecting means fails to detect a packing density identification burst in the magnetic tape.

2. A magnetic tape unit control system as claimed in claim 1, wherein each of the plurality of circuits of the instruction decoding means comprises a flip flop circuit.

3. A magnetic tape unit control system as claimed in claim 2, wherein both the read and write circuit and the packing density circuit comprise a flip flop circuit.

4. A magnetic tape unit control system as claimed in claim 3, wherein the read and write flip flop circuit has a reset output and the packing density flip flop circuit has a reset input and a reset output, and the coupling means comprises an AND gate, having an input connected to the reset output of the read and write flip flop circuit and another input coupled to the instruction decoding means, and an OR gate having an input connected to the output of the AND gate, another input connected to the reset output of the packing density flip flop circuit, and an output connected to the reset input of the packing density flip flop circuit.

5. A magnetic tape unit control system as claimed in claim 3, wherein the packing density flip flop circuit has a set input and one of the plurality of flip flop circuits has a set input and a set output connected to the set input of the packing density flip flop circuit, and the additional coupling means comprises a NOT circuit having an output and an input connected to the output of the identification burst detection circuit, an OR gate having an input connected to the output of the NOT circuit, another input connected to the instruction decoding means, and an output connected to the set input of the one of the flip flop circuits.

6. A magnetic tape unit control system as claimed in claim 3, wherein the packing density identification burst detecting means comprises amplifying means for amplifying the data read out by the readout head and producing an amplified data output signal, first limit circuit means for limiting the output signal of the amplifying means at a predetermined constant voltage limit level and for producing a square pulse sequence output, first integrating circuit means for integrating each pulse of the pulse sequence output of the first limit circuit means and producing an integrated output signal, second limit circuit means for limiting the integrated output signal of the first integrated circuit means at a predetermined constant voltage limit level and producing an output signal, second integrating circuit means for integrating the output signal of the second limit circuit means at a larger time constant than that of the first integrating circuit means and producing an output signal, third limit circuit means for limiting the output signal of the second integrating circuit means at a predetermined constant voltage limit level and producing an output signal, third integrating circuit means for integrating the output signal of the third limit circuit means at a larger time constant than that of the second integrating circuit means and producing an output signal, fourth limit circuit means for limiting the output signal of the third integrating circuit means at a predetermined constant voltage limit level and producing an output signal, and second output means for providing the output signal of the fourth limit circuit means.

* * * * *